United States Patent
Moeller et al.

(10) Patent No.: US 11,031,814 B2
(45) Date of Patent: Jun. 8, 2021

(54) SYSTEM AND METHOD FOR DETECTING AND IDENTIFYING POWER LINE CARRIER CONTROLLED DEVICES WITHIN AN IRRIGATION SYSTEM

(71) Applicant: Valmont Industries, Inc., Omaha, NE (US)

(72) Inventors: Mark Moeller, Valley, NE (US); Tracy A. Thatcher, Gretna, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 16/591,089

(22) Filed: Oct. 2, 2019

(65) Prior Publication Data
US 2020/0127492 A1 Apr. 23, 2020

Related U.S. Application Data

(60) Provisional application No. 62/747,878, filed on Oct. 19, 2018.

(51) Int. Cl.
*A01G 25/16* (2006.01)
*H02J 13/00* (2006.01)

(52) U.S. Cl.
CPC .......... *H02J 13/0062* (2013.01); *A01G 25/16* (2013.01); *H02J 13/0082* (2013.01)

(58) Field of Classification Search
CPC ..... H02J 13/0082; A01G 25/16; A01G 25/09; Y02B 90/20

USPC ....................................................... 340/13.23
See application file for complete search history.

(56) References Cited

U.S. PATENT DOCUMENTS

| | | | | |
|---|---|---|---|---|
| 4,680,583 A | * | 7/1987 | Grover | H04L 12/403 340/9.16 |
| 2013/0304271 A1 | * | 11/2013 | Lee | H02J 4/00 700/295 |
| 2014/0129039 A1 | * | 5/2014 | Olive-Chahinian | A01G 25/16 700/284 |

* cited by examiner

Primary Examiner — Vernal U Brown
(74) Attorney, Agent, or Firm — Milligan PC LLO (57) ABSTRACT

A system and method for detecting and identifying power line carrier controlled devices within an irrigation system having a PLC BUS and a plurality of PLC powered devices. A preferred method includes: initializing a controller; transmitted an identification signal onto the PLC BUS; receiving the transmitted identification signal by a first powered device in the transmission line; recording the signal strength of the received identification signal by the first powered device; reducing the level of the received identification signal by a given increment; receiving the transmitted identification signal by a second powered device in the transmission line; recording the signal strength of the received identification signal by the second powered device; reducing the level of the received identification signal by a given increment; and receiving the transmitted identification signal at the controller.

20 Claims, 7 Drawing Sheets

SYSTEM AND METHOD FOR DETECTING AND IDENTIFYING POWER LINE CARRIER CONTROLLED DEVICES WITHIN AN IRRIGATION SYSTEM

RELATED APPLICATIONS

The present application claims priority to U.S. Provisional Application No. 62/747,878, filed Oct. 19, 2018, which is hereby incorporated by reference herein.

BACKGROUND AND FIELD OF THE PRESENT INVENTION

Field of the Present Invention

The present invention relates generally to a system and method for managing an irrigation system and, more particularly, to a system and method for detecting and identifying power line carrier controlled devices within an irrigation system.

Background of the Invention

Modern center pivot and linear irrigation systems generally include interconnected spans (e.g., irrigation spans) supported by one or more tower structures to support the conduits (e.g., water pipe sections). In turn, the conduits are further attached to sprinkler/nozzle systems which spray water (or other applicants) in a desired pattern. In these modern irrigation systems, a significant number of powered elements are used to control various aspects of irrigation. This requires providing power and control signals to a variety of sensors, sprayers, drive control systems, motors, transducers as well as to a variety of other systems. In operation, control and powering of each of these powered elements may be accomplished using power-line communications (PLC).

When power-line communications are used, a high frequency signal is superimposed on the normal voltage on a power circuit. Within an irrigation machine, such PLC signals are generally used to monitor and control various powered elements. This method of signal transmission is very helpful and convenient since a single set of wires may be used to both power and control each device.

One issue that limits the use of power-line communications is the requirement that each powered element must be individually identified and addressed for the central control system to direct the proper signals to each powered element. This identification of each power element can be very time consuming and inaccurate since the individual elements cannot at present self-identify their presence to the system. Further, this identification must be continually updated when operators swap out components. Because of these limitations, the use of power-line communications is greatly limited and requires significant operator effort to function properly.

To overcome the limitations of the prior art, a reliable and effective system is needed to allow for the quick and accurate identification of powered elements in a power-line communications system.

SUMMARY OF THE PRESENT INVENTION

To address the shortcomings presented in the prior art, the present invention provides a system and method for detecting and identifying power line carrier controlled devices within an irrigation system having a PLC BUS and a plurality of PLC powered devices. According to a first preferred embodiment, the method may include the steps of: initializing a controller; transmitting an identification signal onto the PLC BUS; receiving the transmitted identification signal by a first powered device in the transmission line; recording the signal strength of the received identification signal by the first powered device; reducing the level of the received identification signal by a given increment; receiving the transmitted identification signal by a second powered device in the transmission line; recording the signal strength of the received identification signal by the second powered device; reducing the level of the received identification signal by a given increment; receiving the transmitted identification signal at the controller; polling each powered device for the received strength of the identification signal at each device; creating a lookup table and assigning a system ID number to each powered device based on the reported signal levels received by each device; and sending communications signals to the first powered device based on the system assigned ID number indicated in the lookup table.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

In accordance with preferred embodiments of the present invention, it should be understood that the term "drive unit" may preferably include a number of sub-components including: a motor, a controller, a communication device (such as a PLC or the like) and an alignment device. Further, while the invention is discussed below with respect to three exemplary towers, the number of towers used may be expanded or reduced (i.e. 1-100 towers) as needed without departing from the spirit of the present invention. Further, the term "motor" as used herein may refer to any suitable motor for providing torque to a drive wheel. Accordingly, the term "motor" as used herein may preferably include motors such switch reluctance motors, induction motors and the like.

The terms "program," "computer program," "software application," "module," firmware" and the like as used herein, are defined as a sequence of instructions designed for execution on a computer system. The term "solid state" should be understood to refer to a range of solid state electronic devices which preferably include circuits or devices built from solid materials and in which the electrons, or other charge carriers, are confined entirely within the solid material.

Exemplary solid-state components/materials may include crystalline, polycrystalline and amorphous solids, electrical conductors and semiconductors. Common solid-state devices may include transistors, microprocessor chips, and RAM.

A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course, the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structure), bidirectional triode thyristors (TRIAC), mixed analog and digital, and the like.

Figure 1:
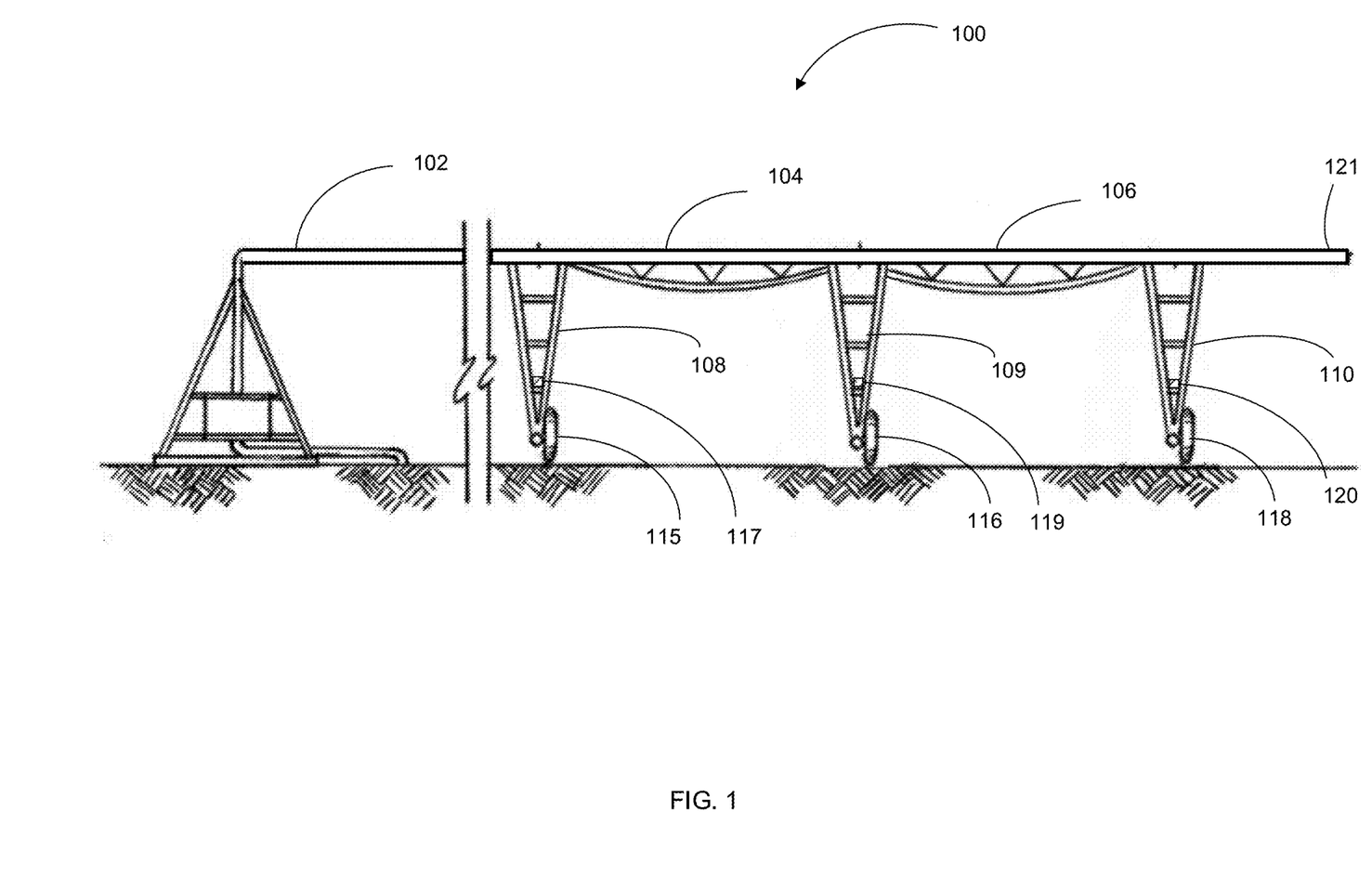
FIG. 1 shows an exemplary irrigation system for use with the present invention.

FIGS. 1-4 illustrate various configurations of irrigation systems which may be used with example implementations of the present invention. As should be understood, the irrigation systems shown in FIGS. 1-4 are exemplary systems onto which the features of the present invention may be integrated. Accordingly, FIGS. 1-4 are intended to be purely illustrative and any of a variety of systems (i.e. fixed systems as well as linear and center pivot self-propelled irrigation systems; stationary systems; corner systems) may be used with the present invention without limitation. For example, although FIG. 1 is shown as a center pivot irrigation system, the exemplary irrigation system 100 of the present invention may also be implemented as a linear irrigation system. The example irrigation system 100 is not intended to limit or define the scope of the present invention in any way. According to further preferred embodiments, the present invention may be used with a variety of motor types such as gas powered, DC powered, switch reluctance, single phase AC and the like.

With reference now to FIG. 1, spans 102, 104, 106 are shown supported by drive towers 108, 109, 110. Further, each drive tower 108, 109, 110 is shown with respective motors 117, 119, 120 which provide torque to the drive wheels 115, 116, 118. As further shown in FIG. 1, the irrigation machine 100 may preferably further include an extension/overhang 121 which may include an end gun (not shown).

Figure 3:
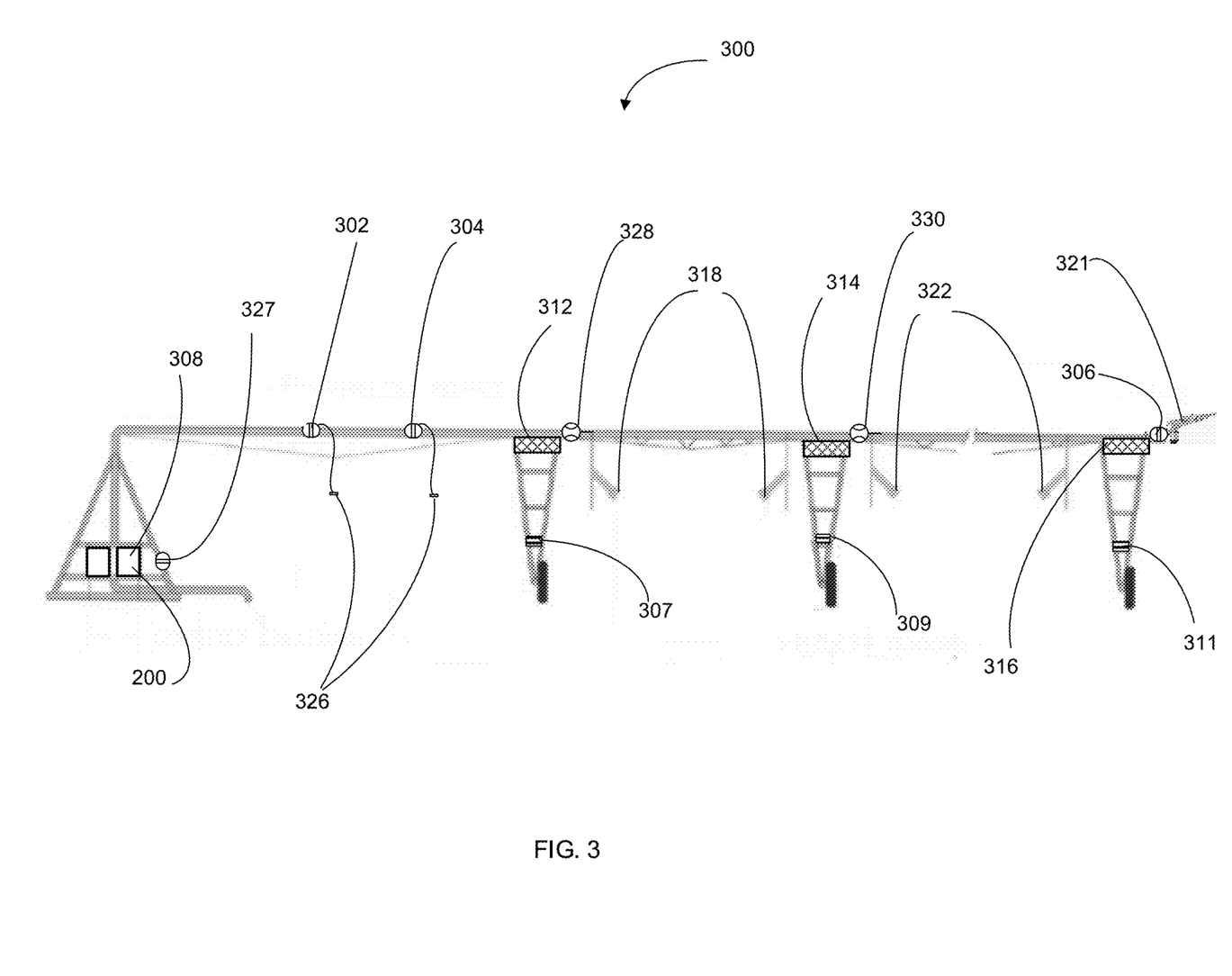
FIG. 3 shows an exemplary irrigation system in accordance with a further preferred embodiment of the present invention.

FIG. 1 provides an illustration of an irrigation machine 100 without many added powered elements and sensors. With reference now to FIG. 3, an exemplary system 300 is shown in which a number of exemplary powered elements are included. As shown, the powered elements may include transducers 327, 328, 330 which are provided to control and regulate water pressure through the system. Further, the system may further include valve controllers 302, 304, 306 to control individual sprinklers including the end gun 321 and other sprinkler heads 326. The system may further include exemplary elements such as crop sensors 318, 322 which preferably may include optional moisture sensors or the like. As further shown, the system may further include solid state tower boxes 312, 314, 316 (including solid-state motor controllers, non-contact alignment devices and other components) which are preferably interconnected to respective drive unit motors 307, 309, 311. Further, the system 300 of the present invention may preferably further include a control/pivot panel 308 which includes a central controller 200 as discussed further below.

Figure 2:
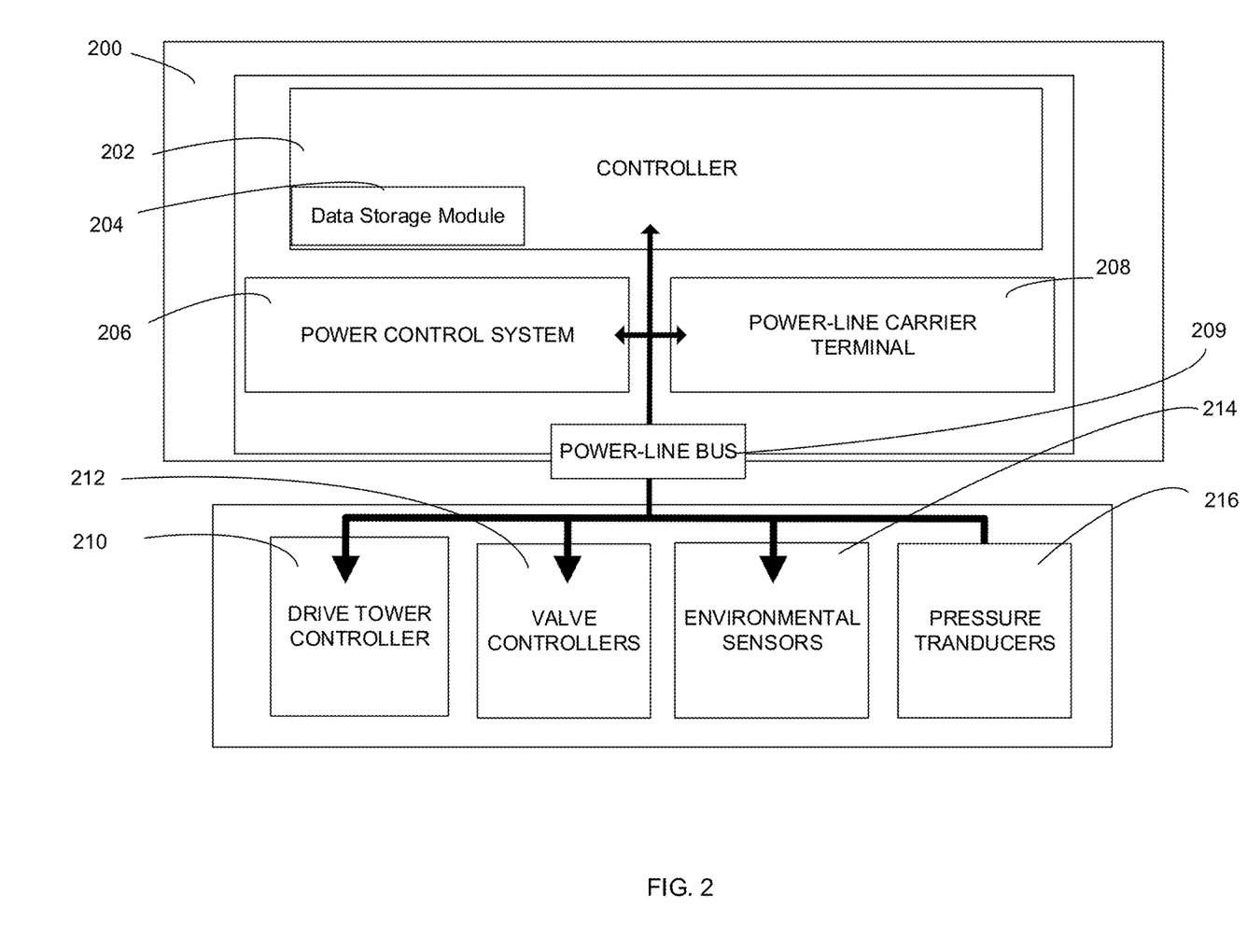
FIG. 2 shows a block diagram illustrating the exemplary processing architecture of a control device in accordance with a first preferred embodiment of the present invention.

With reference now to FIG. 2, an exemplary controller/control device 200 which represents functionality to control one or more operational aspects of the irrigation system 300 shall now be discussed. As shown in FIG. 2, an exemplary control device 200 of the present invention may preferably include a controller/processor 202 having a memory/data storage module 204. The controller 202 preferably provides processing functionality for the control device 200 and may include any number of processors, micro-controllers, or other processing systems. The controller 202 may execute one or more software programs that implement techniques described herein. The data storage module 204 is an example of tangible computer-readable media that provides storage functionality to store various data associated with the operation of the control device 200, such as the software program and code segments mentioned above, or other data to instruct the controller 202 and other elements of the control device 200 to perform the steps described herein. The data storage module 204 may include, for example, removable and non-removable memory elements such as RAM, ROM, Flash (e.g., SD Card, mini-SD card, micro-SD Card), magnetic, optical, USB memory devices, and so forth.

As further shown, the exemplary control device 200 further includes a power control system 206 which preferably may interface with a power-line carrier terminal 208, a power-line BUS 209 and the like as discussed further below. The power control system 206 may further include conductive transmission lines, circuits and the like for controlling and routing electric power, controlling its quality, and controlling the devices attached to a power-line carrier system as discussed further below. As further shown, the exemplary attached devices may include driver tower controllers 210, valve controllers 212, environmental sensors 214, pressure sensors/transducers 216 and any of a variety of other powered devices.

Figure 4:
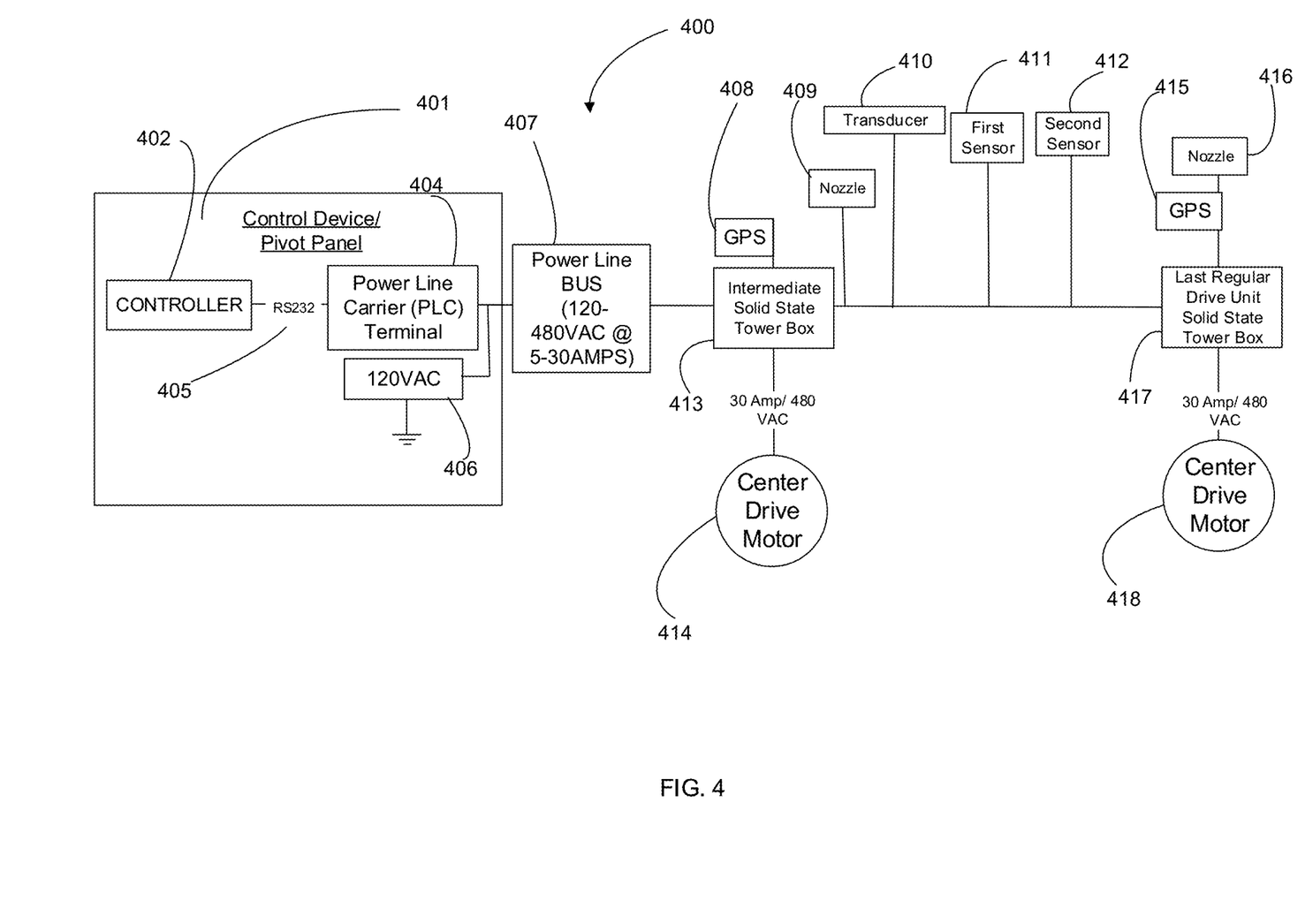
FIG. 4 shows a block diagram of an exemplary system for use with the present invention.

With reference now to FIG. 4, connections between exemplary power/control systems and various powered devices of the present invention shall now be further discussed. As shown, FIG. 4 includes a system controller 402 (within a control device/panel 401) which preferably provides control signals (via power-line carrier terminal 404) and power 406 (via power line BUS 407) to a series of example solid-state tower boxes 413, 417 and other downstream components as discussed further below. Preferably, the power-line carrier (PLC) terminal 404 may output a PLC control signal which may be transmitted on the electrical power distribution network of the irrigation system. According to a preferred embodiment, the PLC terminal 404 may include: a modulator/demodulator, a filter, an amplifier, a line matching unit, and a coupling device. The PLC terminal 404 may further incorporate or be operatively connected to a Line Matching Unit (LMU) for impedance matching between the PLC terminal 404 and the power transmission line.

With further reference to FIG. 4, exemplary downstream components may include: GPS sensors 408, 415, a transducer 410, a first sensor 411, a second sensor 412, nozzle controllers 409, 416 as well as drive motors 414, 418. The solid-state tower boxes and the other powered devices are provided purely as examples and the present invention is not intended to be limited to the use of solid-state tower boxes or any particular mix of powered devices. For example, electro-mechanical tower boxes may be used in place of the solid-state tower boxes without departing from the scope of the present invention.

As further shown, the controller 402 may be connected to the PLC terminal 404 via a serial communication connection 405 (i.e. RS-232) or the like. The PLC terminal 404 is preferably connected with a power source 406 which together provide power and control signals downstream via the power-line BUS 407. According to preferred embodiments, the power-line BUS 407 of the present invention may provide and direct power at any of a variety of different voltages and amps. For example, the power-line BUS 407 of the present invention may provide power over a range of voltages (such as between 0-1000 volts) and over a range of currents (such as 0.1 to 100 amps) as desired without limitation. According to a further preferred embodiment, the power may be provided at 120-480 volts with a current anywhere between 5-50 amps. For instance, the power-line BUS 407 may provide 120 volts AC at 5 amps. According to a further preferred embodiment, the power-line BUS 407 may preferably provide power at 480 volts AC at 30 amps. According to a further preferred embodiment, the PLC system/terminal 404 may operate as a duplex or simplex system.

Figure 5:
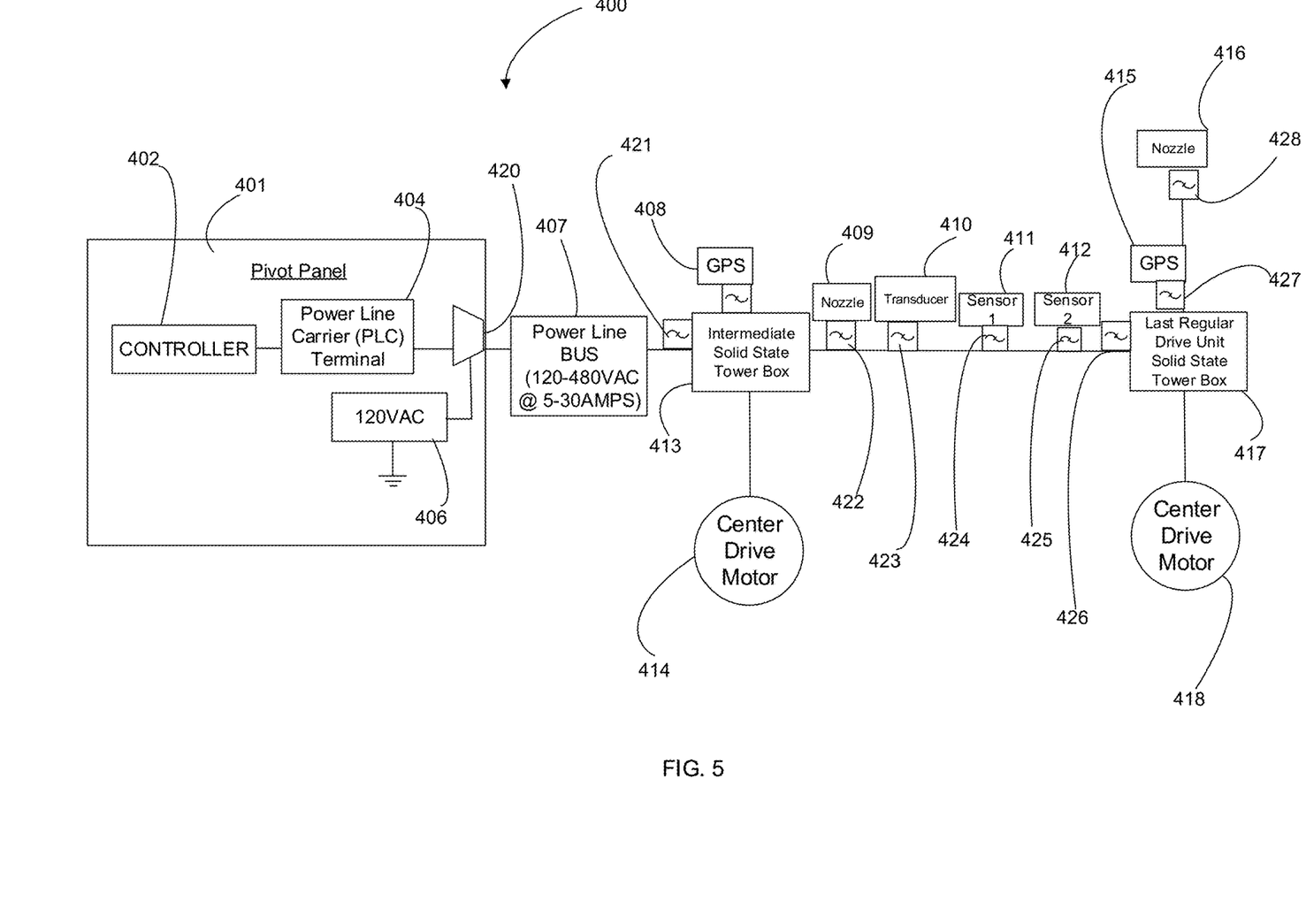
FIG. 5 shows a block diagram of an exemplary control system in accordance with a preferred embodiment of the present invention.

With reference now to FIG. 5, a preferred embodiment of the present invention shall now be discussed. As shown in FIG. 5, the system of the present invention preferably further includes an oscillator/frequency generator 420 which transmits an identification frequency onto the power line BUS 407 at a given signal strength. As further shown in FIG. 5, the system preferably further includes a distributed set of filters 421-428 which drop the signal strength of the transmitted signal at given, incremented amounts (i.e. 3 dB). According to a preferred embodiment, the distributed filters 421-428 may preferably be attached to each powered device or may be incorporated into the circuitry of each powered device. The attenuation of a given signal may be applied to any of a range of frequencies or wavelengths. Further, the distributed filters may be stand-alone or may be combined with or incorporated into any range of filter types, including: low-pass, high-pass, bandpass and/or notch filters.

According to a further preferred embodiment, each powered device may preferably receive and record the power level of the transmitted signal (the "identification signal") as an identifier for each given powered device. As discussed above, the changes in measured power levels may be based on a measurement of changes to any of a range of frequencies or wavelengths. Further, the filters and measurements of the present invention may be applied to multiple frequencies and/or wavelengths.

According to a further preferred embodiment, each powered device may further transmit back to the controller 402 the signal strength of the identification signal received by each device. An example chart of returned signal levels based on an initial signal strength of 30 dB and a distributed filter drop of 3 dB is shown below.

| Device | Returned dB |
| --- | --- |
| Solid State Box 1 | 30 |
| LRDU Solid State Box | 12 |
| GPS 1 | 27 |
| GPS 2 | 9 |
| Transducer | 21 |
| Sensor 1 | 18 |
| Sensor 2 | 15 |
| Nozzle 1 | 24 |
| Nozzle 2 | 6 |

According to further preferred embodiments of the present invention, the controller 402 of the present invention may preferably apply an identification algorithm (as discussed below) to the returned recorded signal levels to determine and assign system identification numbers for each identified powered device. Example assigned system ID numbers are shown in the chart below.

| Device | Return DB | Assigned System ID |
| --- | --- | --- |
| Solid State Box 1 | 30 | 1 |
| LRDU Solid State Box | 12 | 7 |
| GPS 1 | 27 | 2 |
| GPS 2 | 9 | 8 |
| Transducer | 21 | 4 |
| Sensor 1 | 18 | 5 |
| Sensor 2 | 15 | 6 |
| Nozzle 1 | 24 | 3 |
| Nozzle 2 | 6 | 9 |

Figure 6:
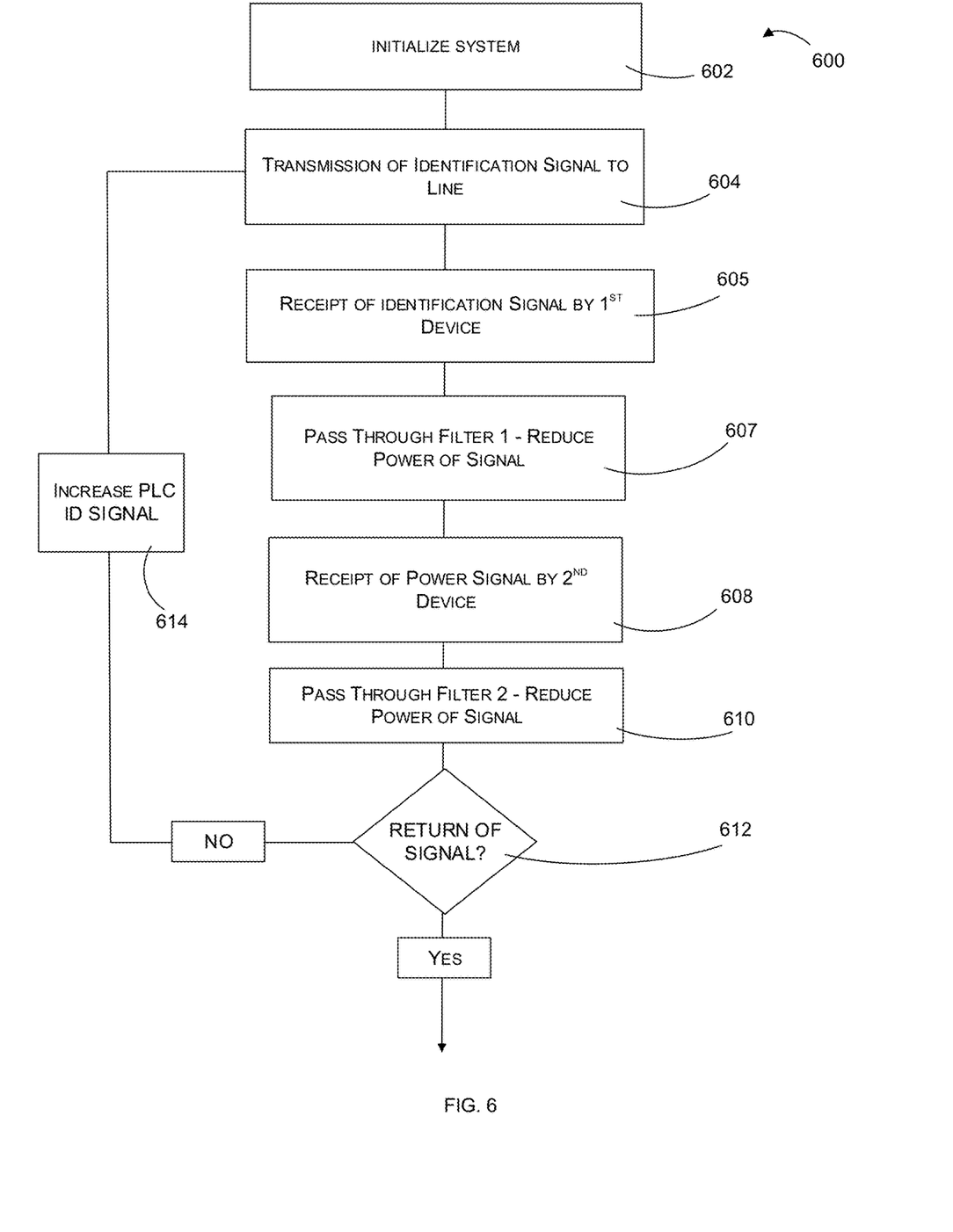
FIG. 6 shows a flow chart illustrating an exemplary control method in accordance with a further preferred embodiment of the present invention.
Figure 7:
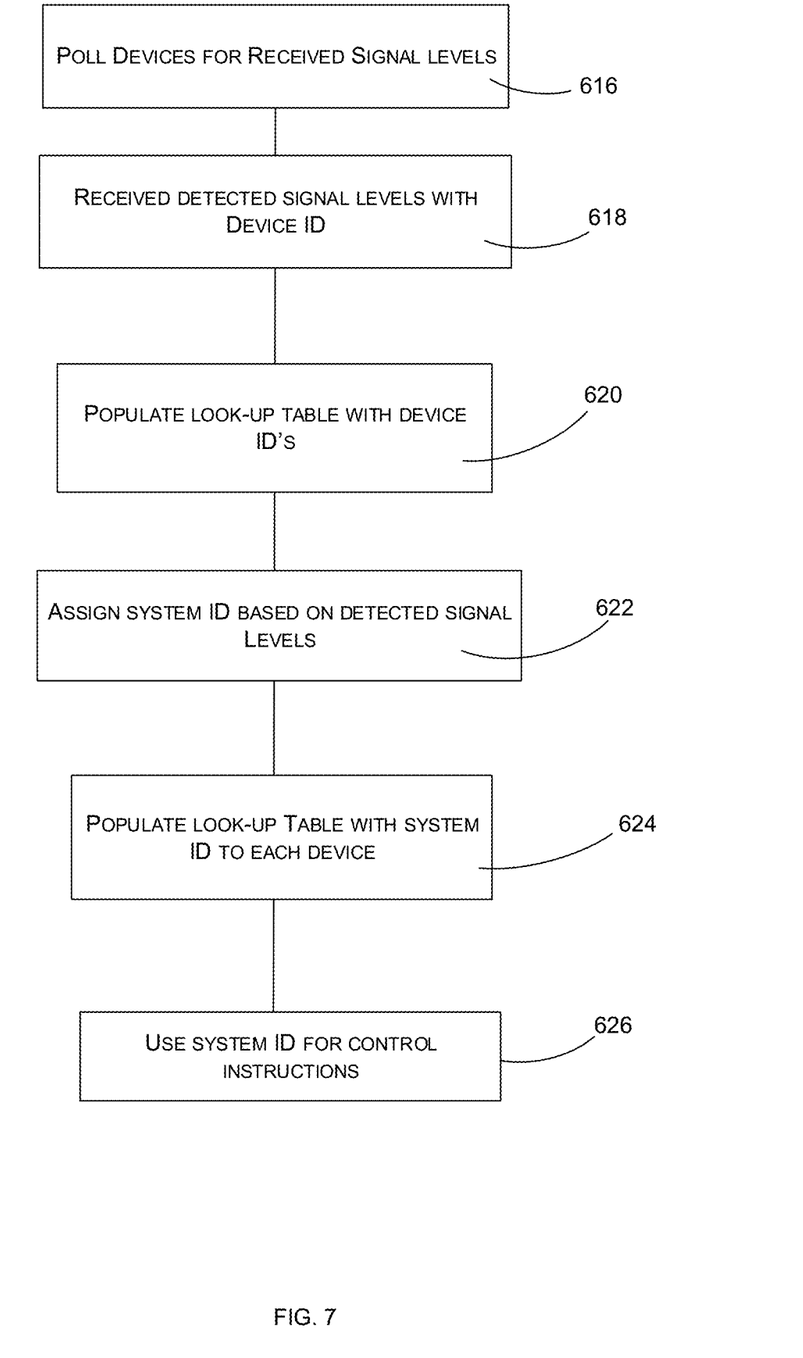
FIG. 7 provides a flow chart illustrating further steps for the method illustrated in FIG. 6.

With reference now to FIGS. 6-7, a preferred method 600 in accordance with further preferred embodiments of the present invention shall now be discussed. As shown in FIG. 6, at a preferred first step 602, the system may preferably be turned on and initialized. Thereafter, at a next step 604, the controller may initiate the transmission of an identification signal onto the PLC BUS. Preferably, the transmission signal may be in the radio band and at a sufficient strength to circulate through the entire irrigation system (i.e. 30 dB). At a next step 605, the transmitted identification signal is preferably received by a first powered device in the transmission line. At a next step 607, the level of the received signal is recorded and the signal is passed through a first filter to reduce the signal strength by a given increment (i.e. 3 dB). At a next step 608, the transmitted identification signal is preferably received by a second powered device in the transmission line. At a next step 610, the level of the received signal is recorded and the signal is passed through a second filter to reduce the signal strength by a given increment (i.e. 3 dB). According to a preferred embodiment of the present invention, the signal is continued to be received, filtered and received again as it circulates through the PLC system and eventually returning to the controller to signal that the polling of each powered device has been completed. At step 612, the controller determines whether the identification signal has been received after a given increment of time has passed. If not, at a next step 614, the controller retransmits the identification signal at an increased level and the method restarts at step 604.

If the identification signal is received back at the controller, then at a next step 616, the controller preferably polls each powered device for the received strength of the identification signal received by each device. At a next step 618, each powered device then transmits to the controller the received signal strength of the identification signal received by the powered device along with a device identifier. At a next step 620, the controller then populates a look-up table with a received device identifier and the received signal levels. At a next step 622, the controller then assigns a system ID number to each powered device based on the reported signal levels received by each device. Thereafter at step 624, the controller preferably populates a look-up table for each identified device which includes the received device identifier and an assigned system ID based on their respective addresses/locations in PLC system. Thereafter, at next step 626, the controller may use the look-up table and the system assigned ID numbers to identify and transmit control instructions to each powered device. In this way, each powered device may be uniquely identified and controlled.

While the above descriptions regarding the present invention contain much specificity, these should not be construed as limitations on the scope, but rather as examples. Many other variations are possible. For example, the processing elements of the present invention by the present invention may operate on a number of different frequencies, voltages, amps and BUS configurations. Further, the communications provided with the present invention may be designed to be one in nature. Further, the systems of the present invention may be used with any arrangement of drive towers including both linear and center pivot systems. Further, as needs require, the processes for transmitting data within the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A method for detecting and identifying power line carrier controlled devices within an irrigation power system having a PLC BUS and a plurality of PLC powered devices, wherein the method comprises:

initializing a controller;

transmitting an identification signal onto the PLC BUS; wherein the identification signal is within the radio band and at a sufficient strength to circulate through the entire irrigation power system;

receiving the transmitted identification signal by a first powered device in the transmission line;

recording the signal strength of the received identification signal by the first powered device;

reducing the level of the received identification signal received by the first powered device by a first predetermined increment;

receiving the transmitted identification signal by a second powered device in the transmission line;

recording the signal strength of the received identification signal by the second powered device;

reducing the level of the received identification signal received by the second powered device by a second predetermined increment;

transmitting the received identification signal from the second powered device to the controller;

receiving the transmitted identification signal at the controller; wherein if the controller determines that the identification signal has not been received after a predetermined amount of time, the controller retransmits the identification signal to the first powered device in the transmission line at an increased level;

polling each powered device for the received strength of the identification signal at each device;

assigning a system ID number to each powered device based on the reported signal levels received by each device; and sending communication signals to the first powered device based on the system assigned ID number.

2. The system of claim 1, wherein the System ID number is stored in a lookup table.

3. In an irrigation system which includes PLC powered devices and a PLC BUS, a control system, wherein the control system comprises:

a PLC terminal;

a controller, wherein the controller is configured to send control signals to the PLC terminal;

a PLC BUS, wherein the PLC BUS is configured to receive control signals from the PLC terminal and to transmit the control signals onto a power transmission line for distribution to a plurality of PLC powered devices;

a frequency generator, wherein the frequency generator is configured to transmit an identification signal at a first frequency onto the PLC BUS at a first determined signal strength;

a first PLC component filter, wherein the first PLC component filter is located with a first PLC device; wherein the first PLC component filter comprises a first distributed filter; wherein the first distributed filter is configured to receive the identification signal and to reduce the amplitude of the identification signal by a first predetermined amount to produce a first component identification signal;

a first PLC component module, wherein the first PLC component module is configured to analyze the identification signal; further wherein the first PLC component module is configured to measure the amplitude of the identification signal; further wherein the first PLC component module is configured to retransmit the first component identification signal to a second PLC component filter and to transmit the measured amplitude to the controller;

wherein the second PLC component filter is located with a second PLC device; wherein the second PLC component filter comprises a second distributed filter; wherein the second distributed filter is configured to receive the first identification signal and to reduce the amplitude of the first identification signal by a second predetermined amount to produce a second component identification signal;

a second PLC component module, wherein the second PLC component module is configured to analyze the first component identification signal; further wherein the second PLC component module is configured to measure the amplitude of the first component identification signal;

further wherein the second PLC component module is configured to retransmit the second component identification signal to a third PLC component filter and to transmit the measured amplitude to the controller;

wherein the third PLC component filter is located with a third PLC device; wherein the third PLC component filter comprises a third distributed filter; wherein the third distributed filter is configured to receive the second identification signal and to reduce the amplitude of the second identification signal by a third predetermined amount to produce a third component identification signal;

a third PLC component module, wherein the third PLC component module is configured to analyze the second component identification signal; further wherein the third PLC component module is configured to measure the amplitude of the second component identification signal; further wherein the third PLC component module is configured to retransmit the third component identification signal to a fourth PLC component filter and to transmit the measured amplitude to the controller;

wherein the fourth PLC component filter is located with a fourth PLC device; wherein the fourth PLC component filter comprises a fourth distributed filter; wherein the fourth distributed filter is configured to receive the third identification signal and to reduce the amplitude of the third identification signal by a fourth predetermined amount to produce a fourth component identification signal;

a fourth PLC component module, wherein the fourth PLC component module is configured to analyze the third component identification signal; further wherein the fourth PLC component module is configured to measure the amplitude of the third component identification signal;

further wherein the fourth PLC component module is configured to retransmit the fourth component identification signal to the controller and to transmit the measured amplitude to the controller; and wherein the controller is configured to receive the measured amplitudes; wherein the received amplitude creates a link between the first PLC component and the component identification signal;

wherein the received amplitude creates a link between the second PLC component and the first component identification signal;

wherein the received amplitude creates a link between the third PLC component and the second component identification signal;

wherein the received amplitude creates a link between the fourth PLC component and the third component identification signal.

4. The system of claim 3, wherein each PLC component stores the measured amplitude of the received identification signal.

5. The system of claim 4, wherein the links between the PLC components are stored in the controller in the form of a look up table.

6. The system of claim 5, wherein the PLC components transmit a Device ID in addition to the measured amplitude.

7. The system of claim 6, wherein the controller is configured to determine a destination address for each PLC component module using received amplitudes; wherein the controller is configured to transmit unique identifying destination addresses to each PLC component module.

8. The system of claim 7, wherein the controller is configured to transmit a first set of instructions to the first PLC component module; wherein the first set of instructions include the first destination address.

9. The system of claim 8, wherein the controller is configured to transmit a second set of instructions to the second PLC component module; wherein the second set of instructions include the second destination address.

10. The system of claim 9, wherein the controller is configured to transmit a third set of instructions to the third PLC component module; wherein the third set of instructions include the third destination address.

11. The system of claim 9, wherein the controller is configured to transmit a fourth set of instructions to the fourth PLC component module; wherein the fourth set of instructions include the fourth destination address.

12. The system of claim 11, wherein the first, second, third and fourth instructions sets are the same.

13. The system of claim 12, wherein the first, second, third and fourth instruction sets are different.

14. The system of claim 13, wherein the first, second, third and fourth predetermined amounts are the same.

15. The system of claim 13, wherein the first, second, third and fourth predetermined amounts are different.

16. The system of claim 14, wherein the initial signal strength is in the range of 20-100 dB.

17. The system of claim 16, where the initial signal strength is in the range of 20-40 dB.

18. The system of claim 17, where the initial signal strength is in the range of 28-35 dB.

19. The system of claim 18, wherein the predetermined amounts are in the range of 1-5 dB.

20. The system of claim 19, wherein the predetermined amounts are in the range of 2-4 dB.

* * * * *